(12) United States Patent
Schlüter et al.

(10) Patent No.: US 6,705,200 B2
(45) Date of Patent: Mar. 16, 2004

(54) VACUUM BRAKE BOOSTER WITH MECHANICAL EMERGENCY BRAKING ASSISTANCE

(75) Inventors: Peter Schlüter, Kammerforst (DE); Michael Possmann, Koblenz (DE)

(73) Assignee: Lucas Varity GmbH (DE)

( * ) Notice: Subject to any disclaimer, the term of this patent is extended or adjusted under 35 U.S.C. 154(b) by 24 days.

(21) Appl. No.: 10/171,085

(22) Filed: Jun. 13, 2002

(65) Prior Publication Data

US 2003/0005819 A1 Jan. 9, 2003

Related U.S. Application Data

(63) Continuation of application No. PCT/EP00/12348, filed on Dec. 7, 2000.

(30) Foreign Application Priority Data

Dec. 15, 1999 (DE) .......................... 199 60 576
May 8, 2000 (DE) .................... 200 08 262 U

(51) Int. Cl.$^7$ ............................... F15B 13/16
(52) U.S. Cl. ......................................... 91/367
(58) Field of Search .............. 91/367, 376 R

(56) References Cited

U.S. PATENT DOCUMENTS 5,493,946 A * 2/1996 Schluter
5,605,088 A * 2/1997 Balz et al.

FOREIGN PATENT DOCUMENTS

| DE | 3115091 | * | 2/1982 |
| EP | 0668200 | * | 8/1995 |
| JP | 9-175373 | * | 8/1997 |

OTHER PUBLICATIONS

Document Bibliography and Abstract for EP 0668200 from the http://12.espacenet.com/espacenet/viewer?PN=EP0668200&CY=ep&LG=en&DB=EPD, printed Jun. 12, 2002.*

* cited by examiner

Primary Examiner—Edward K. Look
Assistant Examiner—Michael Leslie
(74) Attorney, Agent, or Firm—MacMillan, Sobanski & Todd, LLC

(57) ABSTRACT

A vacuum brake booster (1) has a vacuum chamber (4) and a working chamber (3), which are separated from one another in a pressure-proof manner by a movable wall (5). A control valve (6), which has a housing (7) workingly coupled to the movable wall (5), has a valve seat (10), which is disposed in the housing (7) and which in dependence upon the displacement of an input element (8) may control the supply of at least atmospheric pressure to the working chamber (3) in order to achieve a pressure difference at the movable wall (5). For improved braking force assistance during emergency braking operations, an armature (18) cooperating with a permanent magnet (19) is provided in the control valve housing (7) and coupled in actuating direction to the actuating element (8). The armature (18) is spring-biased counter to actuating direction and, in the normal position of the control valve (6), is held at a first distance from the permanent magnet (19). In the course of an approach towards the permanent magnet (19) the armature (18), when it is less than a previously defined second distance away, which is smaller than the first distance, is pulled by the permanent magnet (19) counter to the spring bias acting upon the armature (18) and with simultaneous cancellation of its, in actuating direction, rigid coupling to the actuating element (8) into abutment with the permanent magnet (19). For adjusting the distance between the armature (18) and the permanent magnet (19) in the non-actuated state of the vacuum brake booster (1), the axial position of the permanent magnet (19) relative to the control valve housing (7) and/or the distance between the armature (18) and the valve seat (10) is adjustable.

26 Claims, 10 Drawing Sheets

VACUUM BRAKE BOOSTER WITH MECHANICAL EMERGENCY BRAKING ASSISTANCE

CROSS REFERENCE TO RELATED APPLICATIONS

This application is a continuation of International Application No. PCT/EP00/12348 filed Dec. 7, 2000, which claims priority to German Patent Application No. 19960576.9 filed Dec. 15, 1999 and German Utility Model Application No. 20008262.0 filed May 8, 2000, the disclosures of which are incorporated therein by reference.

BACKGROUND OF THE INVENTION

The invention relates to vacuum brake boosters having a vacuum chamber and a working chamber separated from one another in a pressure-proof manner by a movable wall, having a control valve, which comprises a housing workingly coupled to the movable wall and containing a valve seat, which to achieve a pressure difference at the movable wall is capable of controlling the supply of atmospheric pressure or above-atmospheric pressure to the working chamber in dependence upon the displacement of an input element of the brake booster, as well as having an emergency braking aid comprising a permanent magnet and an armature, which cooperates with the permanent magnet and is spring-biased counter to the actuating direction and in the event of an emergency braking operation is pulled into abutment with the permanent magnet, with the result that the control valve is opened for the supply of atmospheric pressure or above-atmospheric pressure to the working chamber.

Vacuum brake boosters have been known for some time and millions of them are in use for boosting the actuating forces of a vehicle hydraulic brake system and therefore keeping them at a comfortably low level for the driver of a vehicle.

Also known are so-called brake assists. By said term is usually meant a system, which in the event of an emergency braking operation for substantially the same actuating force may provide a driver with an increased braking power. Systems of said type were developed because studies have shown that the majority of vehicle users during an emergency braking operation do not press as hard on the brake pedal as would be necessary to achieve the maximum braking power. The stopping distance of the vehicle is therefore longer than necessary.

Systems of said type already in production employ an electromagnetically actuable brake booster in conjunction with a device capable of determining the actuating speed of the brake pedal. If said device detects an actuating speed above a defined threshold value, it is assumed that an emergency braking situation exists and the brake booster is set to saturation point by the electromagnetic actuating device, i.e. the brake booster supplies its maximum boosting power.

Brake boosters with an electromagnetic actuating facility are however too expensive for motor vehicles in the low to medium price category. There was therefore a demand for solutions, which achieve a brake assist function with a lower outlay.

An, in said respect, improved vacuum brake booster with brake assist function is known from JP 175 373 A. The known vacuum brake booster has a vacuum chamber and a working chamber separated in a pressure-proof manner from one another by a movable wall. A control valve, which has a housing workingly coupled to the movable wall, has an atmosphere valve seat, which is rigidly connected to the housing and which to achieve a pressure difference at the movable wall is capable of controlling the supply of atmospheric pressure to the working chamber in dependence upon the displacement of an input element of the brake booster. For improved braking force assistance during emergency braking operations, an armature cooperating with a permanent magnet is provided in the control valve housing and is coupled in actuating direction rigidly to the actuating element. The armature is spring-biased counter to actuating direction and in the normal position of the control valve is held at a first distance from the permanent magnet. In the course of an approach towards the permanent magnet the armature, when it is less than a previously defined second distance away, which is smaller than the first distance, is pulled by the permanent magnet counter to the spring bias acting on the armature and with simultaneous cancellation of an, in actuating direction, rigid coupling to the actuating element into abutment with the permanent magnet.

The armature substantially takes the form of a hollow cylinder, on the opposite ends of which radially outwardly projecting flanges are disposed. The flange facing the permanent magnet is pulled into abutment with the permanent magnet upon undershooting of the second distance. The flange of the armature remote from the permanent magnet has at its greatest diameter a vacuum valve seat. The permanent magnet is fastened in a mounting, which is connected counter to the actuating direction of the actuating element rigidly to the control valve housing.

In the case of the vacuum brake booster known from JP 175 373 A it was discovered that, in order to achieve a uniform performance of the brake assist, the components configuring the emergency braking aid should have only extremely narrow component tolerances. Otherwise, it is in particular impossible to guarantee the tripping threshold of the brake assist with the required constancy. The close component tolerances of the brake assist resulting from said requirement make mass production difficult and add to the cost of manufacture of the vacuum brake booster.

SUMMARY OF THE INVENTION

The object of the invention is to provide a vacuum brake booster of the described type with a mechanical brake assist, which despite generous component tolerances makes it possible to guarantee a uniform performance of the vacuum brake booster.

Said object is achieved according to the invention by a vacuum brake booster having the features indicated in claim 1. The sub-claims relate to advantageous refinements and developments of the invention.

According to the invention it is proposed, for adjusting the distance between the armature and the permanent magnet particularly in the non-actuated state of the vacuum brake booster, to make the axial position of the permanent magnet relative to the control valve housing and/or the distance between the armature and the valve seat adjustable. This has the advantage that all of the components of the vacuum brake booster and, in particular, the components of the brake assist may be manufactured with generous component tolerances. According to the invention, the purposeful adjustment of the distance between armature and permanent magnet is not effected until during or after assembly of the vacuum brake booster.

The adjustment of the distance between the armature and the permanent magnet may be realized in various ways. If, for example, armature and valve seat are of an integral construction, the axial position of the permanent magnet relative to the housing may be adjusted. If, on the other hand, the axial position of the permanent magnet relative to the housing is permanently defined, then armature and valve seat may be provided in the form of separate components, which are connected to one another at a defined maximum distance from one another. Naturally, it is also possible to combine said options for adjusting the distance between the armature and the permanent magnet.

If armature and valve seat are provided in the form of separate components, a defined distance between said two components may be realized in various ways. For example, a distance element may be disposed between armature and valve seat. A set of distance elements of different defined lengths may then be provided and during assembly of the vacuum brake booster, depending on the desired distance between armature and valve seat, the appropriate distance element may be selected and disposed between armature and valve seat. An alternative form of construction provides that deformable standard distance elements are provided, which in accordance with the desired distance between armature and valve seat are reshaped to the required dimension prior to assembly of the vacuum brake booster. The reshaped distance element is then disposed between the armature and the valve seat.

A defined distance between armature and valve seat may also be realized in that armature and valve seat have mutually complementary threads. During assembly of the vacuum brake booster a screw connection is therefore established between the armature and the valve seat, wherein by means of the length of the screw connection the distance between armature and valve seat is adjustable.

A further possibility of connecting armature and valve seat is to provide an interference fit, i.e. a force locking connection between armature and valve seat. The distance between armature and valve seat is then defined by the length of the interference fit connection.

Armature or valve seat or both components may alternatively have an axially extending, deformable extension. The extension or extensions are preferentially disposed between the armature and the valve seat and therefore determine the distance between armature and valve seat. The deformation of an extension may occur as an effect of a force acting on the extension before or during the assembly of armature and valve seat.

Naturally, the previously described options for adjustment of the distance between armature and valve seat may be combined in any desired manner. Thus, for example, by means of distance elements inserted between armature and valve seat the length of the screw connection or of the interference fit connection may be defined.

There are also various options available for adjusting the axial position of the permanent magnet relative to the control valve housing. For example, the axial position is adjustable by means of a distance element, which is disposed between an end face of the permanent magnet facing an input element of the brake booster or between a mounting for the permanent magnet, on the one hand, and an end face of the control valve housing facing the working chamber, on the other hand. The axial position of the permanent magnet relative to the housing may then be adjusted e.g. by means of the length of the distance element. As already described above, a set of distance elements of defined length may be provided or the distance element may be of a deformable design.

The distance element is preferentially of a circular ring-shaped construction and may concentrically surround the permanent magnet or a mounting for the permanent magnet. In said case, the axial position of the permanent magnet relative to the control valve housing is also adjustable by fixing the distance element, on the one hand, and the permanent magnet or the mounting of the permanent magnet, on the other hand, relative to one another by means of an interference fit and purposefully adjusting the length of the interference fit connection.

In the case of the just described options for adjusting the axial position of the permanent magnet relative to the control valve housing, the permanent magnet or the mounting for the permanent magnet is preferentially biased in the direction of the armature by means of an elastic element, e.g. a spring.

A further form of construction for adjusting the axial position of the permanent magnet relative to the control valve housing provides for the connection to the permanent magnet or to a mounting for the permanent magnet of an extension, which extends from the permanent magnet or from the mounting in the direction of the working chamber. By means of said extension the permanent magnet or its mounting may be coupled counter to the actuating direction of an input element of the vacuum brake booster rigidly to the housing. The extension may comprise one or more arms which, to prevent a rotational movement of the permanent magnet, extend through corresponding openings of the control valve housing or of a housing insert connected counter to actuating direction rigidly to the control valve housing.

By means of the extension or extensions of the permanent magnet or of its mounting the axial position of the permanent magnet relative to the control valve housing may be adjusted in various ways. Thus, for example, an extension may have on an end facing the working chamber a radially outwardly extending flange, which engages behind a distance element. The distance element is in turn connected counter to the actuating direction of the input element rigidly to the control valve housing. By selecting a distance element of appropriate length or by reshaping a standard distance element the axial position of the magnet relative to the control valve housing may then be defined.

According to a preferred form of construction, the at least one extension has on an end facing the working chamber a thread, which cooperates with a complementary thread, which is connected counter to the actuating direction of the input element rigidly to the control valve housing, of e.g. a setting ring. To prevent a rotation of the setting ring from being transmitted to the permanent magnet or its mounting, the extension has one or more arms, which extend through—with regard to a rotational movement—fixed openings of the control valve housing or of a control valve housing insert. The setting ring then cooperates with the regions of the arms of the extension, which extend through said openings. Such a refinement of the vacuum brake booster allows adjustment of the distance between armature and permanent magnet even after assembly of the brake booster, e.g. at preset servicing intervals.

In addition, in the region between the distance element, which cooperates with the flange of the extension, or the setting ring, on the one hand, and the permanent magnet or its mounting, on the other hand, a biased elastic element may be disposed, which presses the distance element and the setting ring, on the one hand, and the permanent magnet or its mounting, on the other hand, in opposite directions.

The vacuum brake booster may comprise a force output element, e.g. in the form of a reaction piston of the master cylinder of a vehicle hydraulic brake system, which element is rotatable relative to the control valve housing and is coupled, with regard to a rotational movement, rigidly to the setting ring. A rotational movement of the force output element is therefore transmitted to the setting ring so that the latter may be conveniently actuated from the outside even after assembly of the brake booster.

Preferably, both the force output element and the setting ring each have at least one axially extending opening, wherein in each case a force transmission element extends through aligned openings of setting ring and force output element. The force transmission element, which may for example take the form of a pin, enables the transmission of a torque from the force output element to the setting ring. To facilitate the introduction of a torque into the force output element, the latter may additionally be provided with a structure in the form of e.g. bumps or indentations, which enable the application of a tool.

According to a further form of construction, the control valve housing at its end facing the working chamber is closed by an insert, which is rotatably disposed inside the control valve housing. Said insert is coupled by a thread to the permanent magnet, which in turn is connected, with regard to a rotational movement about a longitudinal axis of the control valve housing, rigidly to the control valve housing. Because of said, with regard to a rotational movement, rigid coupling of the permanent magnet to the control valve housing, upon rotation of the control valve housing insert relative to the control valve housing the permanent magnet may not co-rotate. Rather, because of the coupling of control valve housing insert and permanent magnet by means of a thread, a rotation of the control valve housing insert effects an axial displacement of the permanent magnet relative to the control valve housing. Since a rotation of the control valve housing insert is still possible even after assembly of the brake booster, said form of construction allows subsequent adjustment of the distance between permanent magnet and armature e.g. in the course of a service inspection.

To facilitate the introduction of a torque into the control valve housing insert, the latter may be provided with an appropriate structure. Said structure may comprise e.g. bumps or indentations, which enable the application of a tool.

The valve seat, which is capable of controlling the supply of at least atmospheric pressure to the working chamber, is preferentially coupled at least in actuating direction both to the input element of the brake booster and to the armature. Such a refinement of the valve seat allows an uncomplicated supply of at least atmospheric pressure to the working chamber in dependence upon the displacement of the input element.

DETAILED DESCRIPTION OF THE INVENTION

Figure 1:
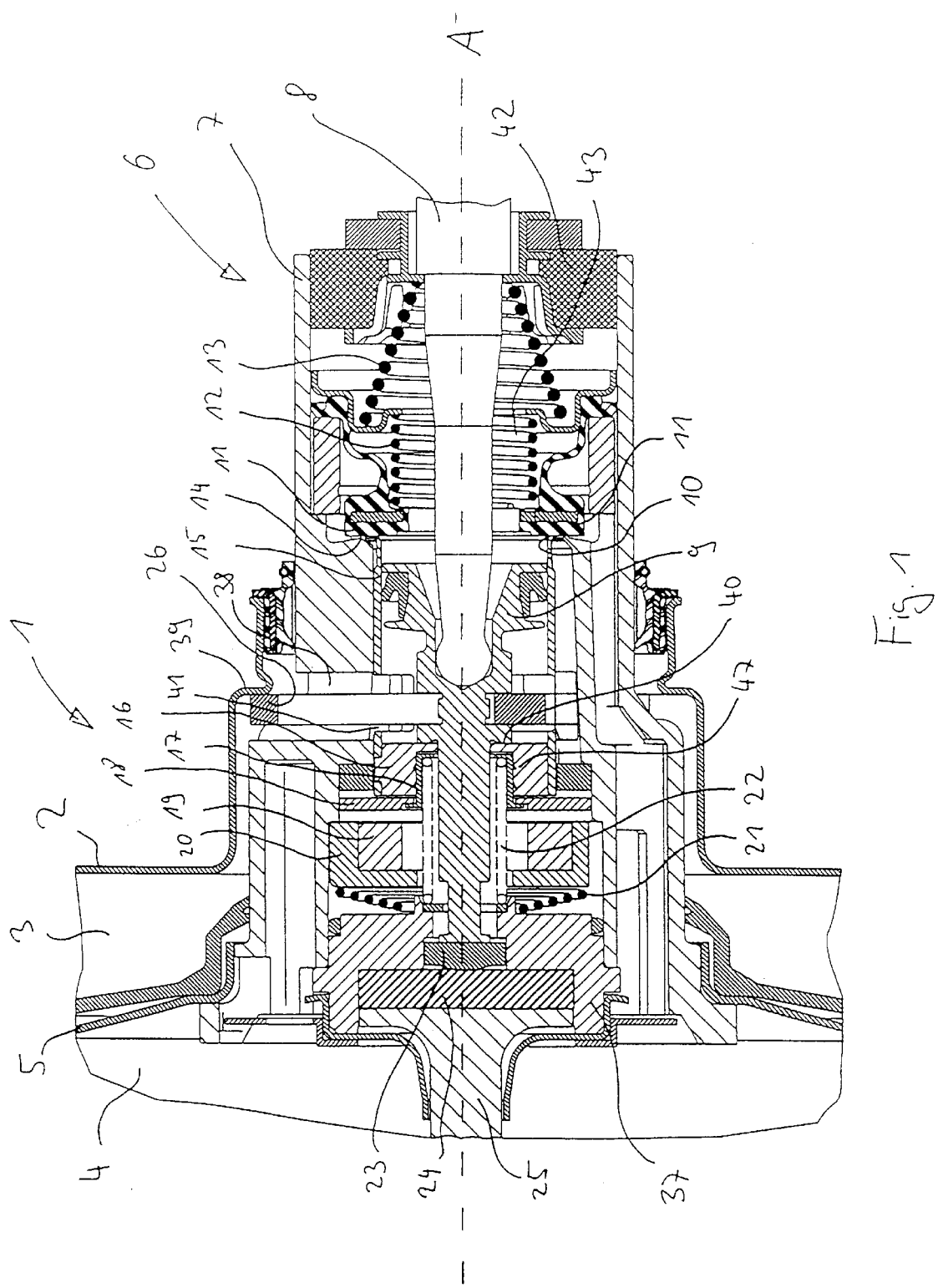
FIG. 1 a longitudinal section through the relevant region of a first embodiment of a vacuum brake booster according to the invention in a normal position, FIG. 2 a second embodiment of a vacuum brake booster according to the invention in a view similar to FIG. 1 and in normal position, FIG. 3 a third embodiment of a vacuum brake booster according to the invention in a view similar to FIG. 1 and in normal position, FIG. 4 a fourth embodiment of a vacuum brake booster according to the invention in a view similar to FIG. 1 and in normal position, FIG. 5 a fifth embodiment of a vacuum brake booster according to the invention in a view similar to FIG. 1 and in normal position, FIG. 6 a sixth embodiment of a vacuum brake booster according to the invention in a view similar to FIG. 1 and in normal position, FIG. 7 a seventh embodiment, similar to the embodiment shown in FIG. 6, of a vacuum brake booster according to the invention in a view similar to FIG. 1 and in normal position, FIG. 8 an eighth embodiment, similar to the embodiment shown in FIG. 7, of a vacuum brake booster according to the invention in a view similar to FIG. 1 and in normal position, FIG. 9 a ninth embodiment of a vacuum brake booster according to the invention in a view similar to FIG. 1 and in normal position, and FIG. 10 a tenth embodiment of a vacuum brake booster according to the invention in a view similar to FIG. 1 and in normal position.

FIG. 1 shows a vacuum brake booster 1 having a housing 2, in which a movable wall 5 separates a vacuum chamber 4 from a working chamber 3.

During operation of the brake booster 1 the vacuum chamber 4 is constantly in communication with a vacuum source, e.g. with the intake tract of an internal combustion engine or with a vacuum pump. A control valve 6 having a housing 7 is provided either for establishing a connection of the working chamber 3 to the vacuum chamber 4, so that the working chamber 3 is also evacuated, or for establishing a connection between the evacuated working chamber 3 and the ambient atmosphere, i.e. the ambient pressure. The movable wall 5 is workingly coupled to the control valve housing 7. In a departure from the illustrated style of construction of the brake booster, the latter may alternatively have two vacuum chambers and two working chambers (tandem style of construction).

The brake booster 1 is actuated by means of a rod-shaped input element 8, which is spring-biased into its normal position by a spring 13 and projects along an axis A into the control valve housing 7 and is fastened by its one, spherically constructed end in a transmission piston 9.

Rigidly connected to the transmission piston 9 is a bar 26, which extends at right angles to the axis A away from the transmission piston 9 and through a channel 38 formed in the control valve housing 7. In the position shown in FIG. 1, the bar 26 lies against a stop 39 of the brake booster housing 2, which stop defines the normal position of the control valve 6, i.e. the relative position of all components of the control valve 6, which they adopt in the non-actuated state of the brake booster 1. The side walls of the channel 38 limit the ability of the bar 26 to move along the axis A, i.e. the maximum stroke of the bar 26 along the axis A is defined by the distance between the side walls of the channel 38.

The transmission piston's 9 end which is opposite to the spherically constructed end of the input element 8 has a sensing disk 23, which transmits an actuating force, which is introduced via the input element 8 into the brake booster 1, via a reaction disk 24 to a reaction piston 25 functioning as a force output element of a master cylinder, which is connected downstream of the brake booster 1 and is not shown here, of a vehicle hydraulic brake system.

The transmission piston 9 penetrates a circular ring-shaped armature 18, which is disposed concentrically with the transmission piston, and an annular permanent magnet 19, which is likewise disposed concentrically with the transmission piston 9 and is accommodated in a mounting 20. As indicated in FIG. 1, ribs are disposed on the outside diameter of the mounting 20 for the permanent magnet 19 and extend along the axis A. The mounting 20 is situated at least via said ribs in contact with an end face of the control valve housing 7 facing the working chamber 3.

A biased spring 21 is disposed between a side of the mounting 20 for the permanent magnet 19 facing the working chamber 3 and a control valve housing insert 37, which closes off an end of the control valve housing 7 facing the vacuum chamber 4. The spring 21, which is supported against the insert 37, presses the mounting 20 counter to the actuating direction of the input element 8 towards a stop of the control valve housing 7.

The vacuum brake booster 1 shown in FIG. 1 contains an armature subassembly, which is composed of a sleeve-shaped extension 15, a fastening ring 16, a setting sleeve 17 as well as a circular ring-shaped armature 18 and has a valve seat 10.

The sleeve-shaped extension 15 takes the form of a hollow cylinder and is coupled at its sleeve end facing the working chamber 3 to the armature ring 18. The opposite sleeve end forms the valve seat 10, which cooperates with the valve sealing member 11.

At the end of the sleeve-shaped extension 15 facing the working chamber 3 a fastening ring 16 is connected to the extension 15 in such a way that it allows an introduction of force into the extension 15. A setting sleeve 17, which in cross section is Z-shaped, is accommodated in the inside diameter of said fastening ring 16.

The setting sleeve 17 comprises a radially inwardly directed collar, which cooperates with a restoring spring 22, and a radially outwardly directed collar for connection of the armature ring 18. The biased restoring spring 22 cooperates with the control valve housing insert 37 firmly connected to the control valve housing 7 and biases the entire armature subassembly counter to the actuating direction of the input element 8.

The fastening ring 16 is preferably made of plastics material. The connection between fastening ring 16 and sleeve-shaped extension 15 may therefore be realized easily by means of plastic injection moulding methods.

For realizing the force transmitting connection of the setting sleeve 17 to the fastening ring 16, various options are available. For example, it is conceivable for the lateral surface of the setting sleeve 17 to have a plurality of extensions 47 distributed over the lateral surface and arranged in a thread-like manner, which through rotation cut into the plastics material of the fastening ring 16. By virtue of said cutting of the setting sleeve into the fastening ring 16 it is therefore possible to adjust the axial projection of the radially outwardly extending collar of the setting sleeve 17 relative to the sleeve-shaped extension 15. The screw connection 47 between the setting sleeve 17 and the fastening ring 16 therefore guarantees the adjustability of the distance between the armature 18 and the valve seat 10. An alternative connection between setting sleeve 17 and fastening ring 16 provides for the provision of an interference fit between the setting sleeve 17 and the fastening ring 16. The axial distance between the armature 18 and the valve seat 10 is then adjustable by means of the length of the interference fit connection.

The radially outwardly extending collar of the setting sleeve 17 engages behind the armature ring 18 in such a way that the axial movement of the armature ring 18 is limited, on the one hand, by said collar of the setting sleeve 17 and, on the other hand, by the fastening ring 16 and/or the sleeve-shaped extension 15. Since the magnetic forces of the permanent magnet 19 act upon the armature ring 18 already in the non-actuated state of the vacuum brake booster 1, the armature ring 18 automatically positions itself against the radially outwardly extending collar of the setting sleeve 17. The clearance existing at the rear relative to the end face of the sleeve-shaped extension 15 and/or the fastening ring 16 does not influence the cooperation of armature ring 18 and permanent magnet 19. Despite the clearance, there is therefore a coupling of the armature ring 18 to the input element 8 in actuating direction of the input element. Furthermore, despite the clearance, the armature ring 18 is biased counter to actuating direction by the restoring spring 22.

The armature 18 cooperating with the permanent magnet 19 is displaceable along the axis A. The compression spring 22, which is disposed radially between the permanent magnet 19 and/or the armature 18 and the transmission piston 9 and is supported by its one end against the insert 37 and by its other end against the setting sleeve 17, spring-biases the armature 18 counter to actuating direction and towards an annular collar 40 formed on the transmission piston 9. The compression spring 22 therefore ensures that in the normal position of the control valve 6 an axial air gap exists between the armature 18 and the permanent magnet 19, i.e. that the armature 18 is held at a first distance from the permanent magnet 19.

On the free end of the sleeve-shaped extension 15 a first annular valve seat 10 of the control valve 6 is formed. The first valve seat 10 cooperates with a likewise annular valve sealing member 11, which is biased towards it by a spring 12, and may control the connection between the ambient atmosphere and the working chamber 3 of the brake booster 1.

Formed radially outside of and concentrically with the first valve seat 10 and on the inside of the control valve housing 7 is a second annular valve seat 14 of the control valve 6, which valve seat 14 likewise cooperates with the valve sealing member 11 and may control the connection between the vacuum chamber 4 and the working chamber 3 of the brake booster 1.

As illustrated, the bar 26 projects through a recess 41 of the sleeve-shaped extension 15. In said recess the bar 26 has, in the direction of the axis A, a clearance which is smaller than the maximum possible stroke of the bar 26 in the channel 38.

An actuation of the brake booster 1 displaces the input element 8 into the brake booster 1 and/or the control valve 6, i.e. in the drawing, to the left. Said displacement of the input element 8 is transmitted to the transmission piston 9. The transmission piston 9 in said case via its annular collar 40 also drives the armature subassembly 15, 16, 17, 18 in actuating direction.

The effect of the displacement of the armature subassembly 15, 16, 17, 18 is that the first valve seat 10 formed on the hollow-cylindrical extension 15 is lifted off the valve sealing member 11, with the result that ambient air may pass through a filter element 42 and a channel 43 surrounding the input element 8, past the open valve seat 10 and through the channel 38 formed in the control valve housing 7, into the working chamber 3. At the movable wall 5 a pressure difference subsequently arises and the resultant force is transmitted from the movable wall 5 to the control valve housing 7, which delivers said force to the previously mentioned master cylinder, which is not shown here.

The first valve seat 10 of the control valve 6 is therefore, in dependence upon the displacement of the input element 8 relative to the control valve housing 7, opened to a greater or lesser extent, so that a correspondingly increasing assistance force of the brake booster 1 arises, which results from the pressure difference effective in each case at the movable wall 5.

During conventional service brake operations, which are referred to here as normal braking operations, the input element 8 and hence the armature 18 are displaced only relatively slightly in actuating direction. The compression spring 22 is so designed that the restoring force it exerts upon the armature 18 during such normal braking operations is greater than the force of the permanent magnet 19 trying to pull the armature 18 in actuating direction, i.e. in the drawings, to the left. Thus, during a normal braking operation the first valve seat 10 is rigidly coupled to the input element 8 not only in actuating direction (via the transmission piston 9, the annular collar 40 of the transmission piston 9 and the armature subassembly 15, 16, 17, 18) but also counter to actuating direction (via the armature subassembly 15, 16, 17, 18, which is pressed by the compression spring 22 against the annular collar 40, and via the transmission piston 9). Each displacement of the input element 8 is accordingly transmitted without delay to the first valve seat 10.

If an actuating force initially applied to the input element 8 during a normal braking operation is not increased, the valve sealing member 11 in the course of the displacement of the control valve housing 7 comes back into contact with the first valve seat 10, so that the air supply into the working chambers 3 is interrupted (position of equilibrium, both valve seats 10 and 14 closed).

However, if the input element 8 is actuated rapidly and with a relatively large stroke, such as is typical of a panic braking operation (emergency braking operation), the armature 18 moves much closer towards the permanent magnet 19 so that, when the distance between the armature 18 and the permanent magnet 19 is less than a second distance, which is smaller than the previously mentioned first distance, the force of the compression spring 22 is no longer sufficient to keep the armature 18 away from the permanent magnet 19. Instead, the force exerted by the permanent magnet 19 upon the armature 18 then predominates and the latter comes into abutment with the permanent magnet 19. Thus, the maximum possible opening cross section of the first valve seat 10 is achieved and ambient air flows into the working chamber 3 until the maximum possible pressure difference and hence the maximum possible boosting force of the brake booster 1 is achieved (so-called saturation point of the brake booster).

Since the armature 18, by coming into abutment with the permanent magnet 19, has detached itself from the annular collar 40 of the transmission piston 9, the first valve seat 10 is uncoupled from the input element 8 and therefore remains open even if a driver operating the brake booster 1 at a further stage of the emergency braking operation is no longer capable of fully applying the necessary input force. In other words, even if the input element 8 at a further stage of the emergency braking operation shifts slightly counter to actuating direction on account of the high reaction forces which then arise, this does not lead to closing of the first valve seat 10 because said restoring movement of the input element 8 is not transmitted to the first valve seat 10.

It is only when the return stroke of the input element 8 is so great that the bar 26 comes into contact with the, in the drawing, right edge of the recess 41 of the sleeve-shaped extension 15 that the restoring force acting upon the input element 8 is transmitted to the armature 18, the restoring force being sufficient to detach the armature 18 from the permanent magnet 19. The first valve seat 10 then comes into contact with the valve sealing member 11 and displaces the latter counter to actuating direction, with the result that the second valve seat 14 is opened and a connection is established between the working chamber 3 and the vacuum chamber 4. The working chamber 3 is evacuated and the normal state illustrated in FIG. 1 is reattained.

It is evident from the above description that it is ultimately the compression spring 22 which defines the tripping threshold of the brake assist function. Said tripping threshold should not be set too low, otherwise unwanted full braking operations might occur, but on the other hand should not be set too high in order to ensure that, even with a less forceful driver, during an emergency braking operation the desired tripping of the brake assist function still occurs.

Figure 2:
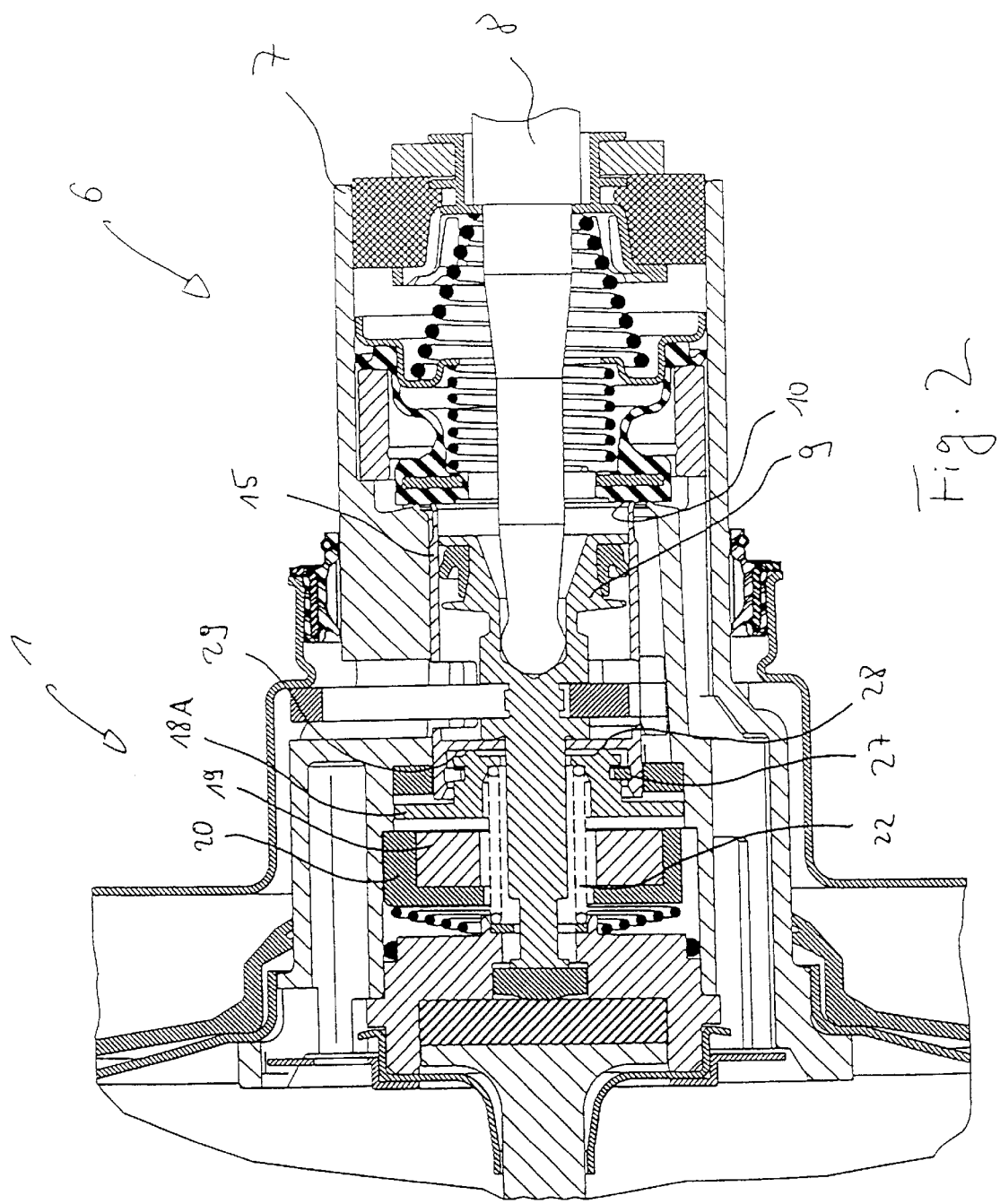

FIG. 2 shows a second embodiment of a vacuum brake booster 1. As in the first embodiment, the distance between the permanent magnet 19 and the armature 18A is adjusted by varying the axial extension of an armature subassembly. The armature subassembly illustrated in FIG. 2 comprises, in addition to the armature 18A, a sleeve-shaped extension 15, which is connected by a securing ring 27 to the armature 18A. A valve seat 10 is formed once more by the free end of the sleeve-shaped extension 15.

The armature 18A has a circumferential annular face 28, which faces the sleeve-shaped extension 15 and which is in communication with an end face 29 of the sleeve-shaped extension 15. By means of the restoring spring 22 it is ensured that said contact between the annular face 28 and the end face 29 exists at least when the vacuum brake booster 1 is not actuated.

The annular face 28 is designed as a deformable extension of the armature 18A. By deformation of the annular face 28 in axial direction it is therefore possible to adjust the axial extension of the armature subassembly 15, 18A, 27 and hence the distance between armature 18A and valve seat 10. Instead of, or in addition to, formation of the deformable annular face 28 on the armature 18A, an extension corresponding to the annular face 28 may be disposed on the end face 29 of the sleeve-shaped extension 15 facing the armature 18A.

In order, after tripping of the brake assist has been effected, to detach the armature 18A from the permanent magnet 19, the sleeve-shaped extension 15 and the armature 18A are connected by the securing ring 27 in such a way that the return stroke movement of the sleeve-shaped extension 15 is transmitted via the securing ring 27 to the armature 18A. A clearance provided between the groove in the armature 18A, which receives the securing ring 27, and the securing ring 27 is in said case so dimensioned that the armature 18A, given a deformation of the annular face 28 during assembly of the armature subassembly 15, 18A, 27, may move up accordingly, without the moving-up being impeded by the securing ring 27.

Figure 3:
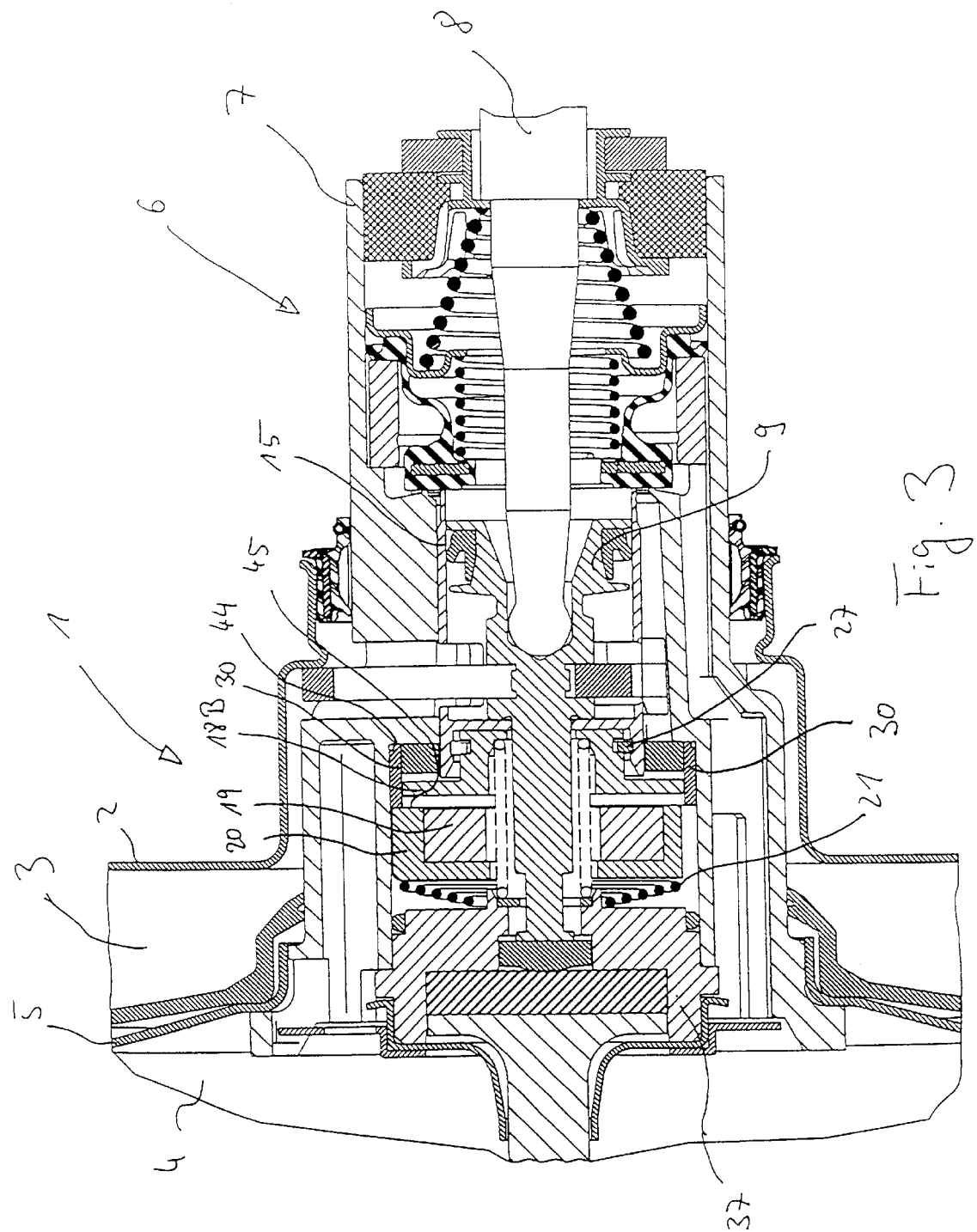

FIG. 3 shows a vacuum brake booster 1, in which the axial position of the permanent magnet 19 relative to the control valve housing 7 is adjustable. The armature subassembly 15, 18B, 27 of the vacuum brake booster according to FIG. 3 is, apart from the absence of a deformable annular face, identical to the armature subassembly illustrated in FIG. 2.

In a departure from the armature subassembly illustrated in FIG. 2, the permanent magnet mounting 20 no longer rests directly against a shoulder of the control valve housing 7. Rather, a distance element 30 is disposed between the end face 44 of the mounting 20 facing the input element 8 and an end face 44 of a stop of the control valve housing 7 facing the working chamber 3. The distance element takes the form of a setting ring 30, which concentrically surrounds the circular ring-shaped armature 18B. The biased spring 21 disposed between the base of the mounting 20 and the control valve housing insert 37 ensures that the mounting 20 is in permanent contact with the setting ring 30.

The distance between the permanent magnet 19 and the armature 18B and/or the axial position of the permanent magnet 19 relative to the housing 7 is therefore purposefully adjustable by selecting a setting ring 30 of appropriate dimensions or by reshaping a standard setting ring.

Figure 4:
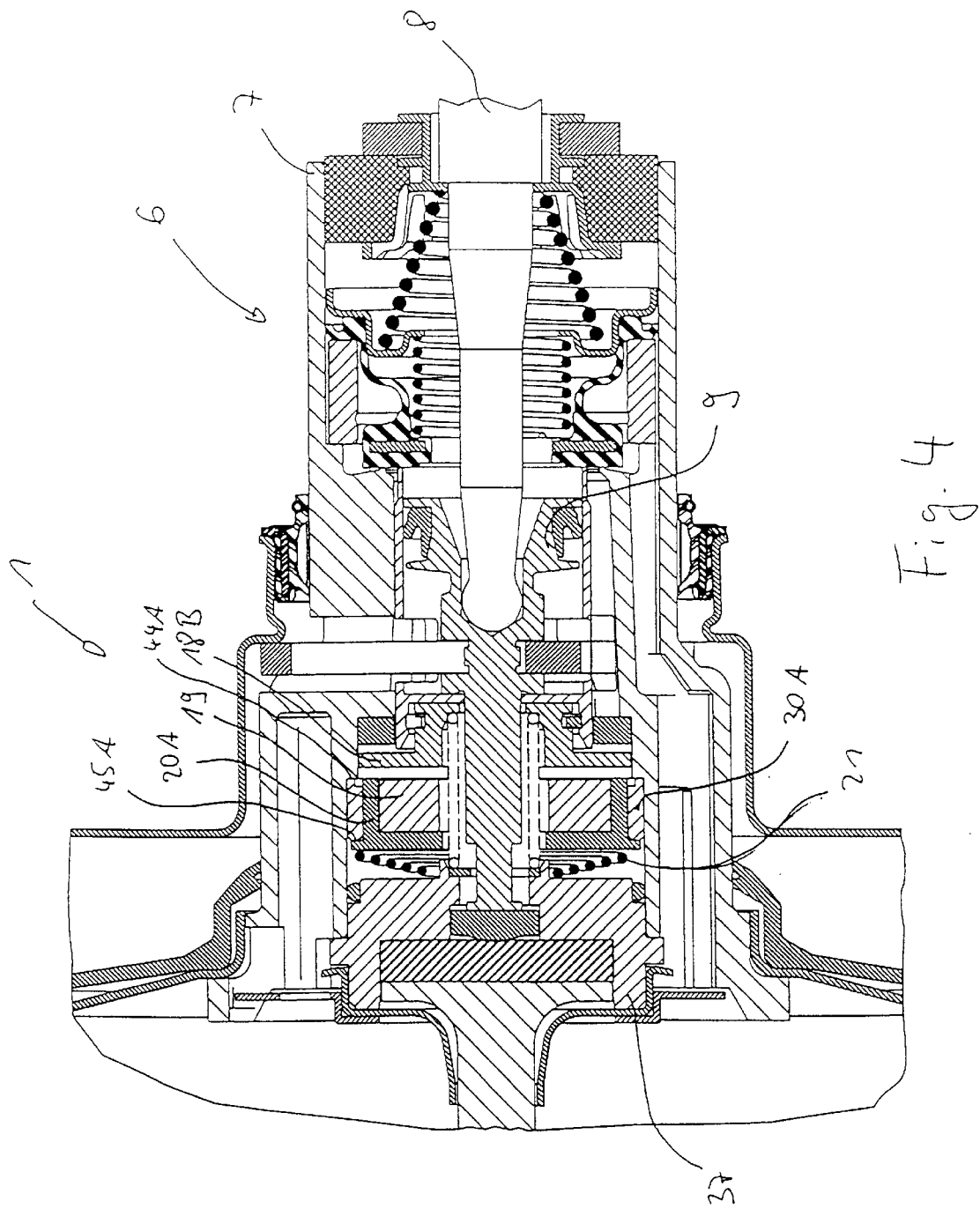

FIG. 4 shows a further embodiment of a vacuum brake booster 1 with adjustable axial position of the permanent magnet 19 relative to the control valve housing 7. The form of construction illustrated in FIG. 4 substantially corresponds to the vacuum brake booster 1 shown in FIG. 3. In a departure from the latter, however, the distance element 30A takes the form of a setting ring, which concentrically surrounds the mounting 20A of the permanent magnet 19. The setting ring 30A has a clearance relative to the mounting 20A of the permanent magnet 19 and is in contact, on the one hand, with an end face 44A of the control valve housing 7 and, on the other hand, with an end face 45A of the mounting 20A. Said contact is ensured by a biased spring 21, which is disposed between the rear side of the mounting 20A and the control valve housing insert 37.

Once more, by selecting a setting ring 30A of appropriate dimensions and/or by suitably reshaping the setting ring 30A, the axial position of the permanent magnet 19 relative to the control valve housing 7 may be adjusted.

Figure 5:
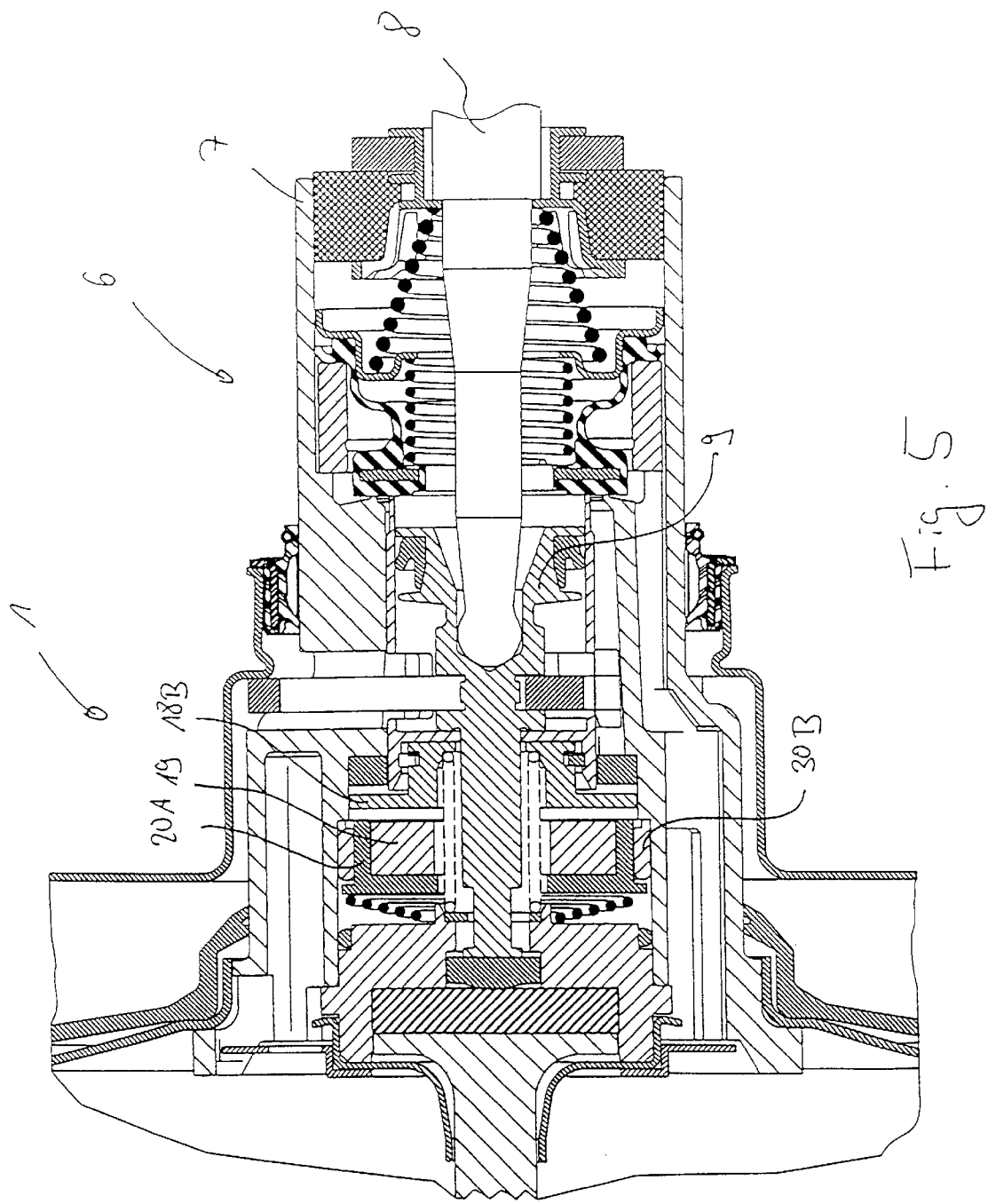

FIG. 5 shows a fifth embodiment of a vacuum brake booster 1, which is based on the embodiment sketched in FIG. 4. In the embodiment illustrated in FIG. 5 the distance element in the form of setting ring 30B, unlike the fourth embodiment, does not have any clearance relative to the mounting 20 but is connected by an interference fit to the mounting 20. The interference fit was designed in such a way that the forces arising during operation of the vacuum brake booster 1 may be taken up without any axial displacement of the setting ring 30B relative to the mounting 20A. The length of the interference fit connection between the setting ring 30B and the mounting 20A was selected in accordance with the desired axial position of the permanent magnet 19 relative to the control valve housing 7.

Figure 6:
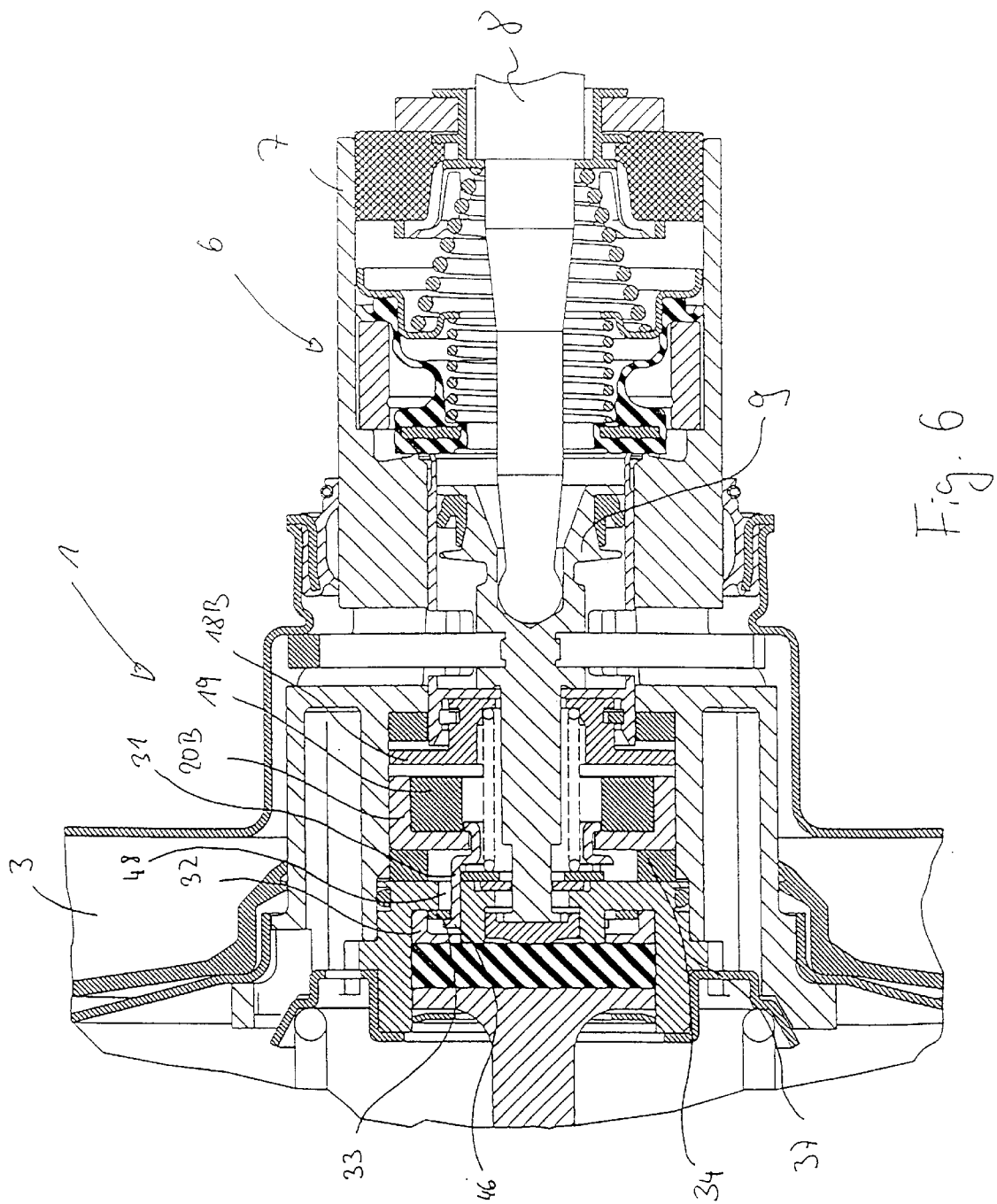

FIG. 6 shows a sixth embodiment of a vacuum brake booster 1, in which the axial position of the permanent magnet 19 relative to the control valve housing 7 is adjustable. In the embodiment illustrated in FIG. 6, an extension 31 extending in the direction of the working chamber 3 is provided in the form of a fettering sleeve. The fettering sleeve 31 has an end portion, which faces the mounting 20B and engages behind the mounting 20B at the inside. On an opposite end portion the fettering sleeve 31 has holding arms (only one of which is shown in FIG. 6), which extend in the direction of the working chamber 3 through openings 48 of a control valve housing insert 37. Said arms of the fettering sleeve 31 have on their end a radially outwardly directed flange 46, which in turn engages behind a distance element 33. The distance element 33 takes the form of a circular ring-shaped disk, which with its end face facing the input element 8 rests against the base of a bore inside the control valve housing insert 37. The control valve housing insert 37 in turn is in mechanical working connection with the control valve housing 7. Once again, by using distance elements 33 of different dimensions and/or by suitably reshaping a distance element 33 the position of the permanent magnet 19 relative to the control valve housing 7 and hence the air gap between permanent magnet 19 and armature 18B may be adjusted. For transmitting forces from the control valve housing 7 to the reaction disk 24 there is additionally disposed in the bore of the insert 37 a supporting ring 32, which has a recess forming a free space, in which the distance element 33 is accommodated. In said manner the forces may be transmitted around the distance element 33.

As a rule, the forces of attraction of the permanent magnet 19 exerted in the normal position upon the armature 18B are sufficient to apply the mounting 20B against the embracing flange-like end of the fettering sleeve 31. In order, however, to define the abutment of the mounting 20B with the fettering sleeve 31 more clearly, an elastic ring element 34 may be disposed between mounting 20B and control valve housing insert 37. The elastic ring element 34, which may be made e.g. of rubber, has to make a sufficient amount of deformation distance available to prevent any clearance arising between mounting 20B and ring element 34.

Figure 7:
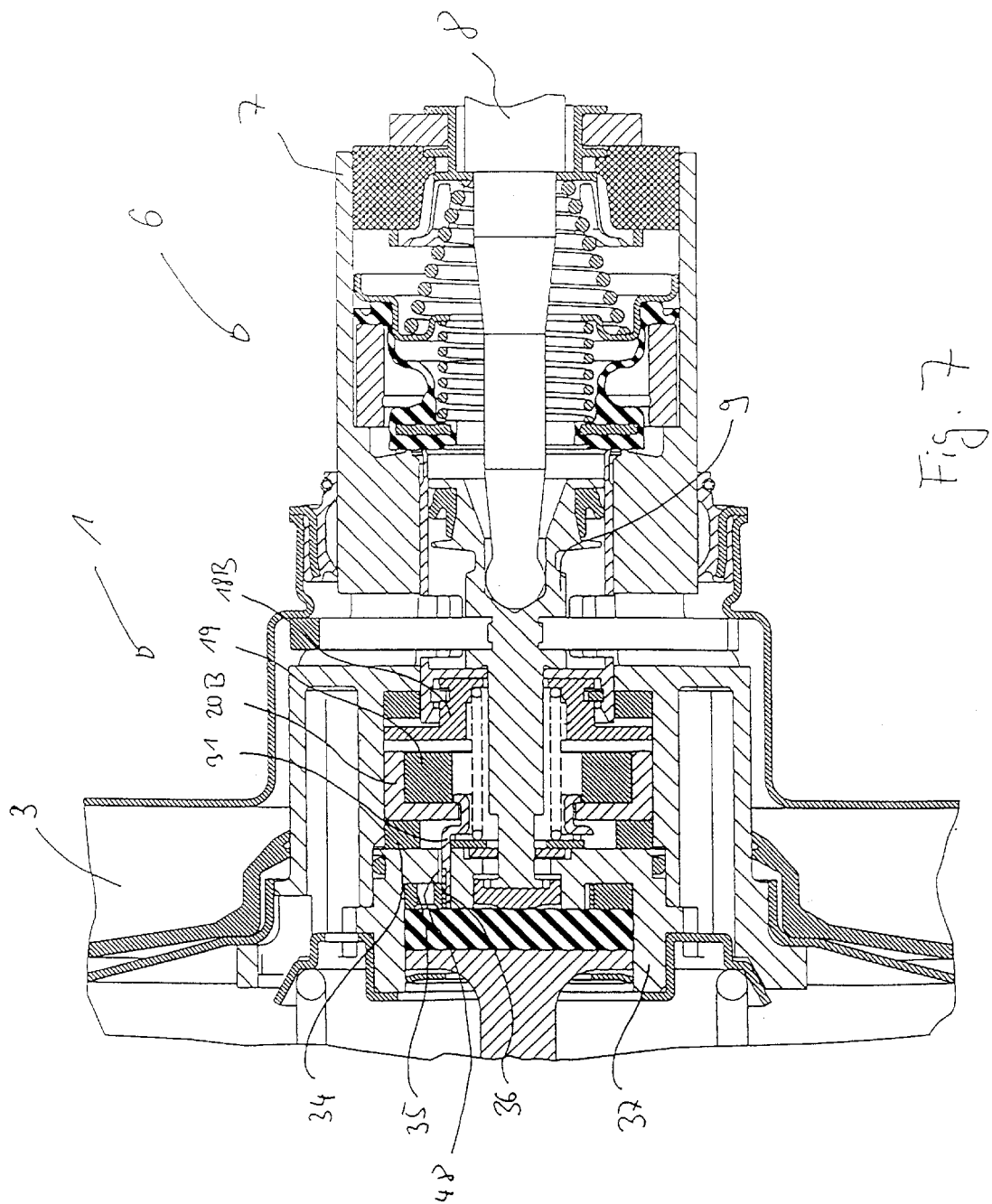

A seventh embodiment of a vacuum brake booster 1 with adjustable distance between armature 18B and permanent magnet 19 is illustrated in FIG. 7. Similar to FIG. 6, the vacuum brake booster 1 illustrated in FIG. 7 has a permanent magnet mounting 20B with an extension 31 in the form of a fettering sleeve 31 extending in the direction of the working chamber 3. The fettering sleeve 31 likewise has an end portion, which engages behind the mounting 20B at the inside. The fettering sleeve 31 moreover has a plurality of arms (only one of which is shown in FIG. 7), which extend through corresponding openings 48 in the base of a bore of the insert 37. The regions of the arms of the fettering sleeve 31 projecting from the openings 48 are provided with an external thread 36. Said external thread 36 is in constant engagement with a complementary internal thread of a setting ring 35, which is inserted in the base of the bore of the insert 37. By rotating the setting ring 35 the position of the permanent magnet 19 relative to the armature 18B may therefore be adjusted. As the insert 37 is firmly connected to the housing 7, the rotational movement of the setting ring 35 may not be transmitted to the mounting 20B and/or the permanent magnet 19. The arms of the fettering sleeve 31, in the event of a rotational movement of the setting ring 35, namely come into abutment with the walls of the insert 37, which delimit the openings 48.

Figure 8:
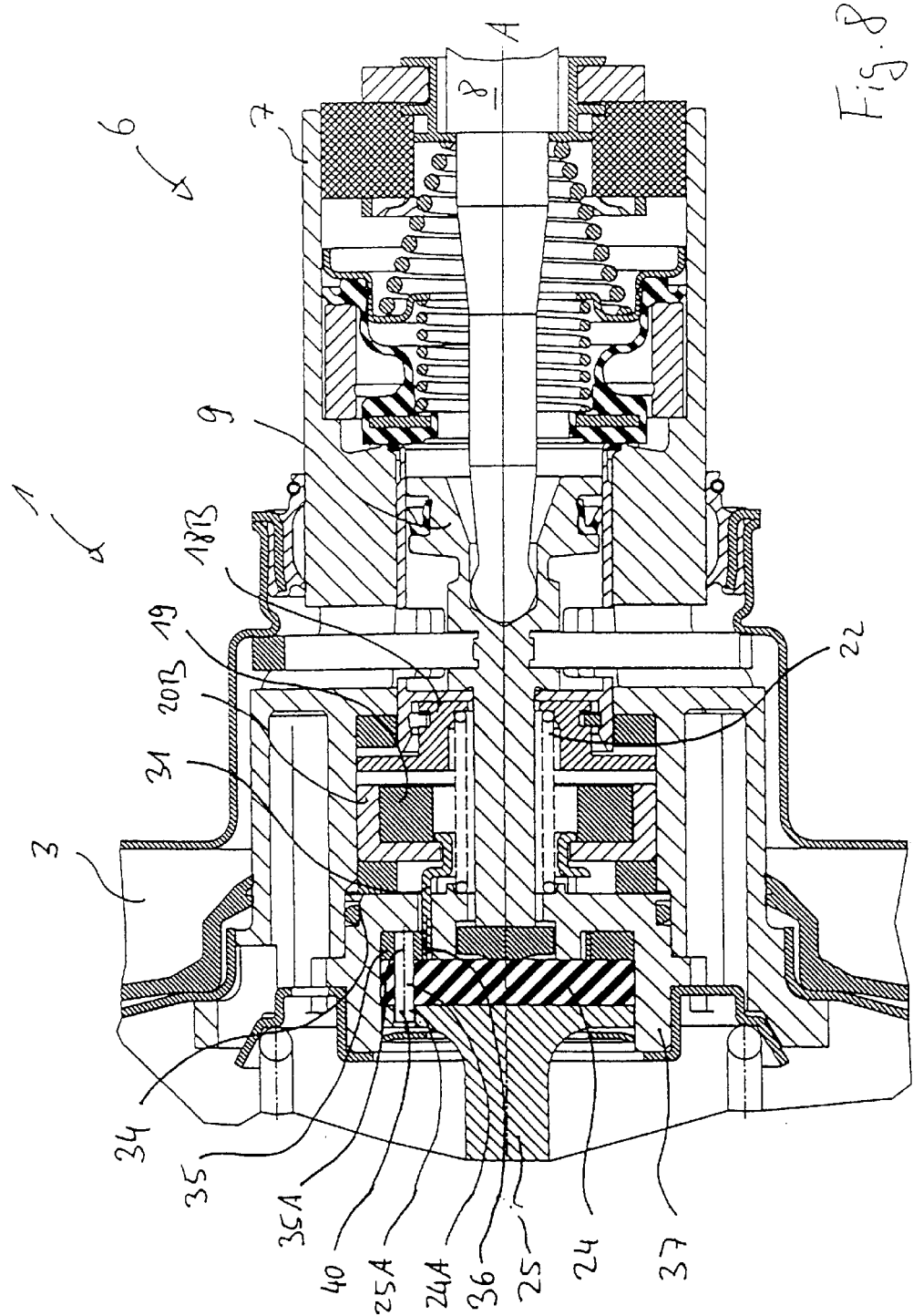

In FIG. 8 an eighth embodiment of a vacuum brake booster 1 with adjustable distance between armature 18B and permanent magnet 19 is illustrated, which is based on the embodiment illustrated in FIG. 7. In a departure from the embodiment illustrated in FIG. 7, the restoring spring 22 for the armature 18B is however supported not via an annular disk, but directly against the insert 37 of the control valve housing 7. Furthermore, reaction piston 25 and reaction disk 24 are each provided with an axially extending opening 25A, 24A, which openings extend in each case flush with a likewise axially extending opening 35A of the setting ring 35.

Extending through said openings 24A, 25A, 35A of reaction disk 24, reaction piston 25 and control valve housing insert 37 is a force transmission element 40 in the form of a cylindrical pin. Said force transmission arrangement comprising reaction piston 25, reaction disk 24, setting ring 35 and force transmission element 40 guarantees that a torque introduced into the reaction piston 25 is transmitted to the setting ring 35 and may be used to adjust the axial position of the permanent magnet 19 relative to the control valve housing 7. Formed onto the reaction piston 25 is a non-illustrated key face, which enables the introduction of a torque into the reaction piston 25.

Figure 9:
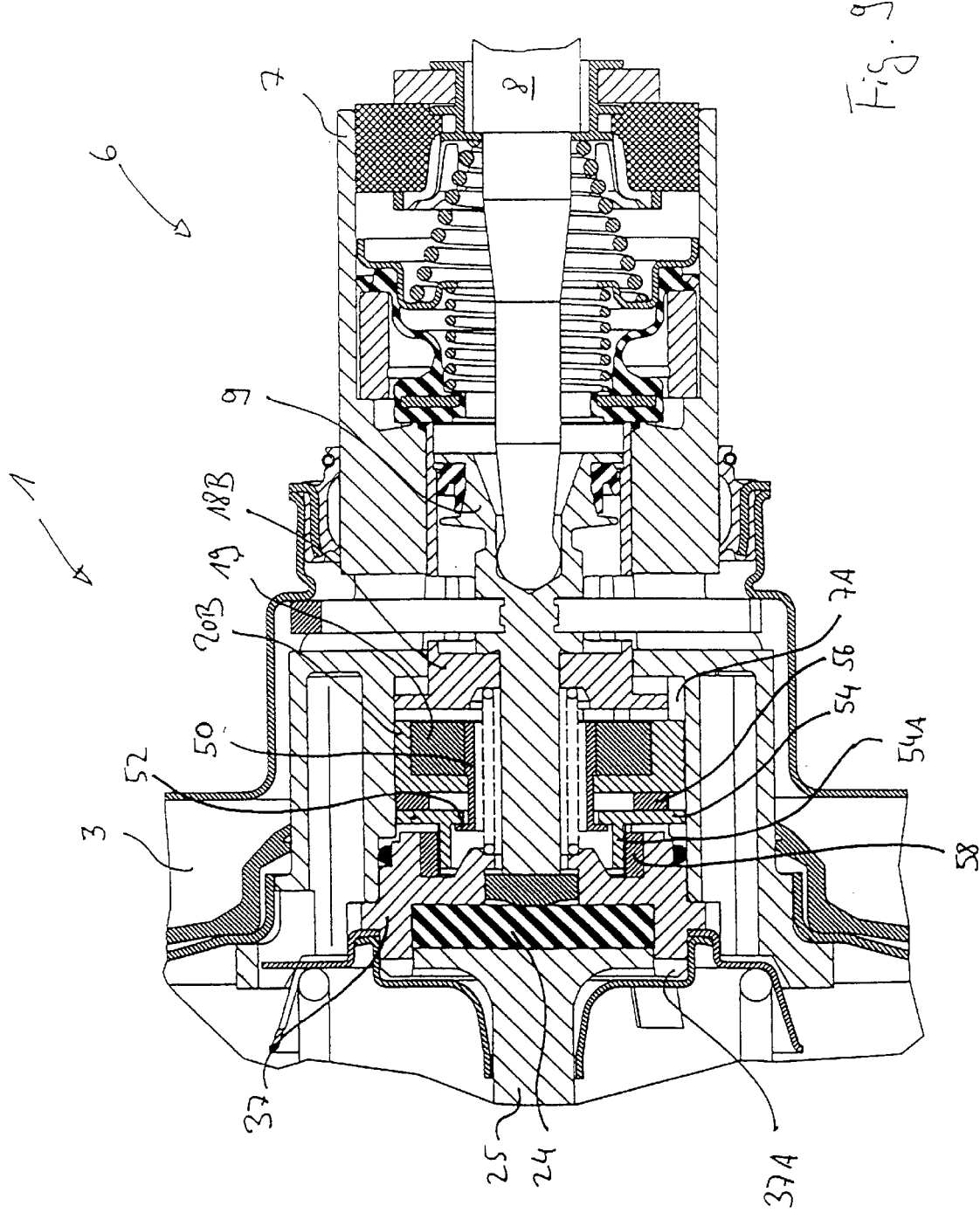

FIG. 9 shows a ninth embodiment of a vacuum brake booster 1 with adjustable distance between armature 18B and permanent magnet 19.

The permanent magnet 19 and a mounting 20B of the permanent magnet 19 have a central opening. A hollow-cylindrical extension 50 extending in the direction of the working chamber 3 projects into said central opening and is connected by its portion extending into said central opening to the permanent magnet 19 and the latter's mounting 20B. The hollow-cylindrical extension 50 on its end facing the working chamber 3 has a radially outwardly extending collar 52. Said collar 52 engages behind a ring element 54, which is movably guided inside the control valve housing 7. Disposed between an end face of the ring element 54 facing the input element 8 and an end face of the permanent magnet mounting 20B facing the working chamber 3 is a likewise annular elastic element 56 made of an elastomeric material.

The ring element 54 is provided with a hollow-cylindrical extension 54A, which extends in the direction of the reaction piston 25 and is provided radially at the outside with a thread and projects into a recess of the control valve housing insert 37. A complementary thread for connection of the sleeve-shaped extension 54A of the ring element 54 is formed radially on the inside of an annular insert 58. Said insert 58 is disposed radially at the inside of the recess of the control valve housing insert 37 and connected firmly to the control valve housing insert 37.

The control valve housing insert 37, which closes off the control valve housing 7 at its end facing the reaction piston 25, is guided rotatably inside the control valve housing 7 and connected, with regard to an axial displacement, rigidly to the latter. The permanent magnet mounting 20B accommodating the permanent magnet 19, on the other hand, is admittedly movable in axial direction but a rib structure 12A of the control valve housing 7 is situated in engagement with radially outwardly projecting extensions of the permanent magnet mounting 20B, with the result that co-rotating of the permanent magnet 19 upon a rotational movement of the control valve housing insert 37 relative to the control valve housing 7 is ruled out. Instead, a rotation of the control valve housing insert 37 gives rise to an axial displacement of the permanent magnet 19 disposed in the mounting 20B, the reason for this being that the permanent magnet 19 is coupled by a thread to the control valve housing insert 37.

The control valve housing insert 37 has a structure 37A in the form of a key face to facilitate the introduction of a torque into the control valve housing insert 37.

Figure 10:
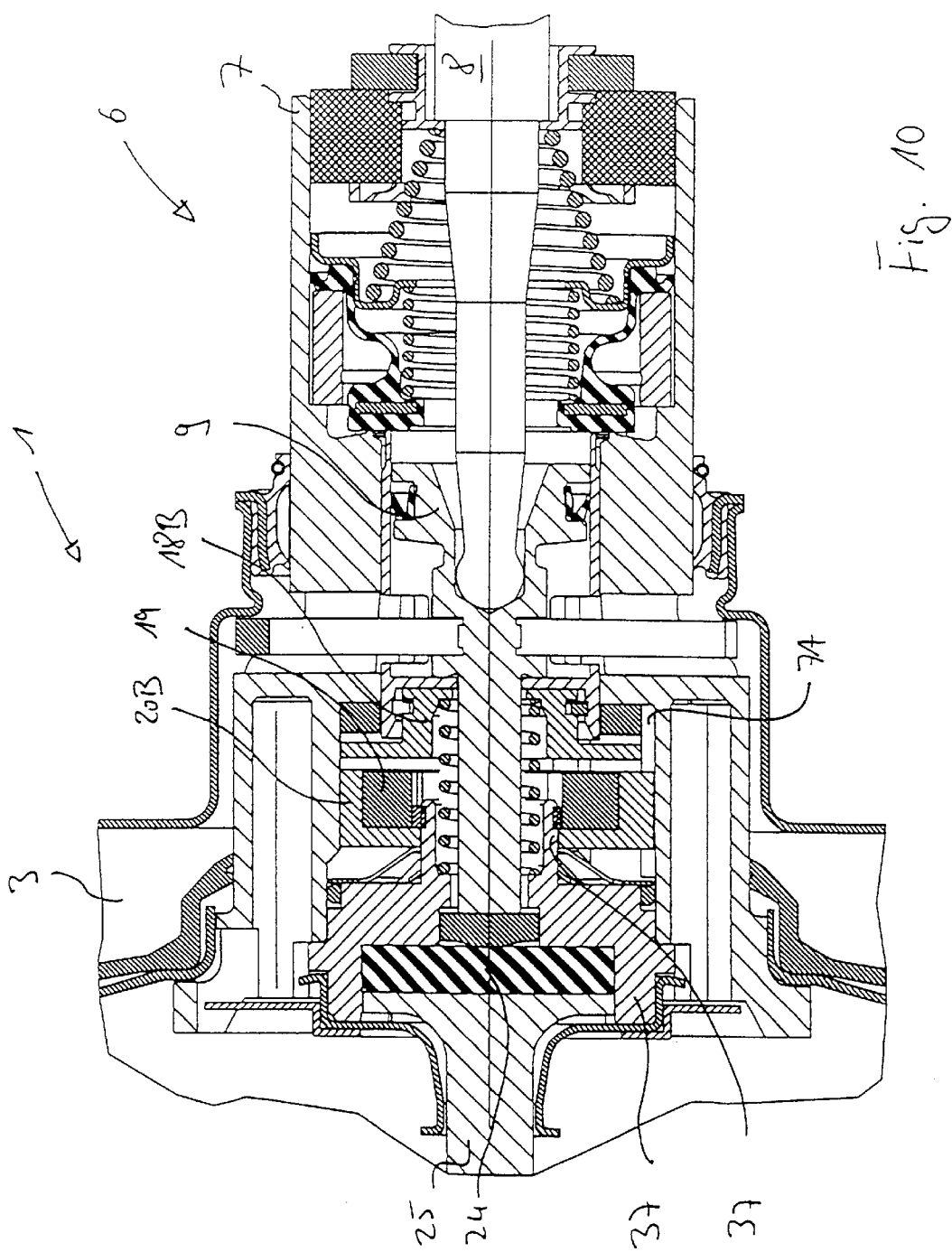

A tenth embodiment of a vacuum brake booster 1 with adjustable distance between armature 18B and permanent magnet 19 is illustrated in FIG. 10. As in FIG. 9, the control valve housing insert 37, which closes off the control valve housing 7 at its end facing the reaction piston 25, is supported rotatably inside the control valve housing 7 and connected by a thread to the permanent magnet 19 disposed in a mounting 20B.

The control valve housing insert 37 has a hollow-cylindrical extension 37B, which extends in the direction of the input element 8 into a central opening of the unit comprising permanent magnet 19 and permanent magnet mounting 20B. Said extension 37B is provided radially at the outside with a thread, which cooperates with a complementary thread formed radially at the inside of the permanent magnet 19.

A rotation of the axially movable permanent magnet mounting 20B relative to the control valve housing 7 is once more prevented by a rib structure 7A of the control valve housing 7, which structure cooperates with radially outwardly projecting extensions of the mounting 20B. Since the rotatable control valve housing insert 37 is coupled by a thread to the merely axially movable permanent magnet 19, a rotation of the control valve housing insert 37 gives rise to an axial displacement of the permanent magnet 19. To facilitate the introduction of a torque into the control valve housing insert 37, an appropriate structure is formed on an end face of the control valve housing insert 37 remote from the input element 8.

The forms of construction of vacuum brake boosters 1 illustrated in FIGS. 7 to 10 allow the adjustment of a distance between armature 18B and permanent magnet 19 even after assembly of the vacuum brake booster. Thus, it is possible after assembly purposefully to set the tripping threshold of the brake assist to a defined value.

In accordance with the provisions of the patent statues, the principle and mode of operation of this invention have been explained and illustrated in its preferred embodiment. However, it must be understood that this invention may be practiced otherwise than as specifically explained and illustrated without departing from its spirit or scope.

What is claimed is:

1. Vacuum brake booster, comprising
a vacuum chamber and a working chamber separated in a pressure-proof manner from one another by a movable wall,
a control valve, which comprises a housing workingly coupled to the movable wall and containing a valve seat, which to achieve a pressure difference at the movable wall is capable of controlling the supply of atmospheric pressure or above-atmospheric pressure to the working chamber in dependence upon the displacement of an input element of the brake booster,
an emergency braking aid comprising a permanent magnet and an armature, which cooperates with the permanent magnet and is spring-biased counter to the actuating direction and during an emergency braking operation is pulled into abutment with the permanent magnet, with the result that the control valve is held open for the supply of atmospheric pressure or above-atmospheric pressure to the working chamber, wherein, for adjusting the distance between the armature and the permanent magnet, at least one of the axial position of the permanent magnet relative to the control valve housing and the distance between the armature and the valve seat is adjustable.

2. Vacuum brake booster according to claim 1, wherein the armature and the valve seat are designed as separate components.

3. Vacuum brake booster according to claim 2, wherein the valve seat takes the form of a sleeve, wherein one sleeve end is coupled to the armature and the opposite sleeve end cooperates with a valve sealing member.

4. Vacuum brake booster according to claim 2, wherein a distance element is disposed between the armature and the valve seat, wherein by means of the axial extension of the distance element the distance between armature and valve seat is adjusted.

5. Vacuum brake booster according to claim 2, wherein the armature is coupled by a screw connection to the valve seat, wherein by means of the length of the screw connection the distance between armature and valve element is adjusted.

6. Vacuum brake booster according to claim 2, wherein the armature and the valve seat are connected to one another by an interference fit, wherein by means of the length of the interference fit connection the distance between armature and valve seat is adjusted.

7. Vacuum brake booster according to claim 2, wherein one of the armature and the valve seat has an axially extending, deformable extension, wherein by means of the degree of deformation of the extension the distance between armature and the valve seat is adjusted.

8. Vacuum brake booster according to claim 1, wherein the axial position of the permanent magnet relative to the control valve housing is adjusted by means of a distance element, which is disposed between an end face of the permanent magnet facing the input element or between a mounting for the permanent magnet, on the one hand, and an end face of the control valve housing facing the working chamber, on the other hand.

9. Vacuum brake booster according to claim 8, wherein the axial position of the permanent magnet relative to the control valve housing is adjusted by means of the length of the distance element.

10. Vacuum brake booster according to claim 8, wherein the distance element concentrically surrounds the permanent magnet or the mounting.

11. Vacuum brake booster according to claim 10, wherein the distance element and one of the permanent magnet and the mounting are fixed relative to one another by means of an interference fit and the axial position of the permanent magnet relative to the control valve housing is adjusted by means of the length of the interference fit connection.

12. Vacuum brake booster according to claim 10, wherein the permanent magnet or the mounting is biased counter to an actuating direction by an elastic element.

13. Vacuum brake booster according to claim 1, wherein an extension extending in the direction of the working chamber is connected to one of the permanent magnet and a mounting for the permanent magnet.

14. Vacuum brake booster according to claim 13, wherein the extension comprises one or more arms, which extend through openings of the control valve housing or of a control valve housing insert, which is connected counter to an actuating direction rigidly to the control valve housing.

15. Vacuum brake booster according to claim 13, wherein the extension on an end facing the working chamber has a radially outwardly extending flange and the flange engages behind a distance element, which is coupled counter to the actuating direction rigidly to the control valve housing.

16. Vacuum brake booster according to claim 15, wherein a biased elastic element is disposed between one of the distance element and the setting ring, on the one hand, and one of the permanent magnet and the mounting, on the other hand, the biased elastic element pressing one of the distance element and the setting ring, on the one hand, and one of the permanent magnet and the mounting, on the other hand, away from one another.

17. Vacuum brake booster according to claim 13, wherein the extension on an end facing the working chamber has a thread, which cooperates with a complementary thread coupled counter to the actuating direction rigidly to the control valve housing.

18. Vacuum brake booster according to claim 17, wherein the thread of the extension is formed at least on a region of the extension extending through one of the openings of the control valve housing and the control valve housing insert.

19. Vacuum brake booster according to claim 17, wherein the thread of the extension cooperates with the complementary thread of a rotatable setting ring.

20. Vacuum brake booster according to claim 19, wherein a force output element is provided, which is rotatable relative to the control valve housing and which is coupled, with regard to a rotational movement, rigidly to the setting ring.

21. Vacuum brake booster according to claim 20, wherein the force output element and the setting ring are each provided with at least one axially extending opening, wherein extending through aligned openings of the setting ring and force output element there is in each case a force transmission element.

22. Vacuum brake booster according to claim 20, wherein the force transmission element is provided with a structure for introducing a torque into the force output element.

23. Vacuum brake booster according to claim 1, wherein the control valve housing at an end facing the working chamber has an insert, which is rotatably disposed inside the control valve housing and which is coupled counter to an actuating direction rigidly to the control valve housing and by a thread to the permanent magnet.

24. Vacuum brake booster according to claim 23, wherein the permanent magnet is coupled, with regard to a rotational movement about a longitudinal axis of the control valve housing, rigidly to the control valve housing.

25. Vacuum brake booster according to claim 23, wherein the control valve housing insert is provided with a structure for introducing a torque into the control valve housing insert.

26. Vacuum brake booster according to claim 1, wherein the valve seat is coupled at least in an actuating direction of the input element both to the input element and to the armature.

* * * * *